United States Patent [19]
Miller

[11] 3,873,291
[45] Mar. 25, 1975

[54] METHOD OF PRODUCING GLASS FIBER MATS

[75] Inventor: William R. Miller, Bremen, Ohio

[73] Assignee: Nicofibers, Inc., Shawnee, Ohio

[22] Filed: Mar. 29, 1974

[21] Appl. No.: 456,387

[52] U.S. Cl. ............................ 65/3, 65/4, 65/11 W, 117/4, 117/105.4, 156/174, 161/160, 242/18 G
[51] Int. Cl. ...................... C03b 37/02, C03c 25/02
[58] Field of Search ....... 65/2, 3, 4, 11 W; 156/174; 242/18 G; 117/105.4, 4; 161/160

[56] References Cited
UNITED STATES PATENTS

| | | | |
|---|---|---|---|
| 2,574,221 | 11/1951 | Modigliani | 65/3 |
| 2,644,780 | 7/1953 | Simkins et al. | 156/174 X |
| 3,554,851 | 1/1971 | Modigliani | 156/174 X |

*Primary Examiner*—Robert L. Lindsay, Jr.
*Attorney, Agent, or Firm*—Cooper, Dunham, Clark, Griffin & Moran

[57] ABSTRACT

Method of sequentially producing a plurality of glass fiber mats includes continuously drawing glass filaments from a molten glass supply through a plurality of orifices and winding the filaments about the periphery of a rotating drum. A binder solution is intermittently applied to the filaments being wound on the drum.

The product which is formed comprises a plurality of separable, concentric glass fiber mats.

9 Claims, 2 Drawing Figures

METHOD OF PRODUCING GLASS FIBER MATS

BACKGROUND OF THE INVENTION

The present invention relates to a method of producing glass fiber mats or other unwoven fabrics of thermoplastic filaments.

Glass filamentary products have been formed by the method shown in numerous patents issued to Piero Modigliani, including particularly U.S. Pat. Nos. 2,546,230; 2,574,221; 2,609,320; and 2,913,037. The method shown and described in those patents is commonly referred to as the "Modigliani process." In general, the patents show a process in which glass fibers are continuously drawn from a melting furnace having a plurality of orifices in a bushing at its lower end. The furnace is made to traverse according to a predetermined cyclic arrangement over a path extending generally parallel to the axis of rotation of a rotatable drum, whereupon the glass fibers drawn through the orifices are wound in strata upon the drum. The traversing speed of the furnace and the rotating speed of the drum are interdependent. Thus, the filaments in each stratum which is formed on the drum cross at acute angles with respect to the filaments of adjacent stratum. These strata accumulate as the filaments are continuously wound on the drum to form a condensed glass fiber mat.

The fibrous product produced by winding the glass filaments on the drum is loosely bound and relatively weak. Accordingly, it is impregnated with a suitable binder solution to strengthen it and give it sheet-like characteristics. Preferably, the binder comprises a polyester resin in the presence of a cross-linking agent, such as the monomer diallyl phthalate. This binder is uniformly sprayed in solution on the glass filaments at the drum periodically during the formation of the condensed mat.

When the mat has been built up to a desired thickness, it is removed from the drum, such as by cutting the tubular mat parallel to the axis of rotation of the drum. The mat is placed on a table and is stretched or expanded in a direction transversely of the general lay of the filaments to form an elongated mat. This increases the porosity and reduces the density of the product. The elongated mat is conveyed through a curing oven wherein hot air is blown through the mat to copolymerize the monomer with the unsaturated polyester resing to produce a three-dimensional integral network. After being expanded and cured, the mat is wound up into rolls. These rolls have substantial volume per unit weight. In has not heretofore been known how to sequentially form a plurality of such mats and to wind them concentrically after being expanded.

It is known to produce a composite, laminated mat having a first stratum to which binder is applied and a second stratum to which binder is not applied. The purpose of that method is to form two different decorative patterns in the two distinct strata in a product which gives the appearance of being laminated. However, the strata are intended to remain together and a binder is uniformly applied to the expanded mat by passing the mat through a dip tank. It would not be desirable to delaminate the strata because the unbound layer would fall apart. Thus, that method cannot be used to form concentric, separable mats. See U.S. Pat. No. 3,342,658.

SUMMARY OF THE INVENTION

It is an object of the present invention to provide a method of producing a plurality of glass fiber mats which when wound together have a smaller volume per unit weight than separately wound mats.

It is a further object of the invention to provide a method of sequentially forming glass fiber mats such that they may be handled and concentrically wound together.

It is still another object of the invention to provide a plurality of glass fiber mats produced by the method of the invention and wound up into a single package, so that the package occupies less volume per unit weight than heretofore and so that the inner mats are protected against foreign matter.

These and other objects of the invention are achieved by a method of sequentially producing a plurality of glass fiber mats in which glass filaments are continuously drawn from a molten glass supply contained in a furnace having a plurality of orifices through which the glass filaments are drawn. The filaments are continuously wound about the periphery of a drum rotating about its axis, while the furnace reciprocates over a path extending generally parallel to the axis of rotation of the drum. A binder solution is applied intermittently to the filaments while they are being continuously wound upon the drum. A plurality of separable, concentric mats are formed on the drum.

More particularly, the binder solution is applied cyclically to the filaments being wound on the drum during a first period to form a first tubular, condensed mat. During this first period, the binder solution is preferably applied in cycles of one minute "on" and 1.1 minutes "off". During a second period, no binder is applied but the filaments continue to be wound on the drum. This second period is about 5 to 12 minutes in duration. Preferably, no binder solution is applied during a second period of about 8.75 minutes. At the end of the second period, the binder solution is again applied to the glass filaments which continue to be wound on the drum. During this third period, the binder solution is applied in cycles of one minute "on" and 11.1 minutes "off". Application of the binder solution causes the filaments to form an integral, three-dimensional structure. As no binder solution is applied to the filaments during the second period, there is no binding of the filaments in those strata. Two concentric mats are formed upon the drum which separate in the region where no binder solution was applied. This method may be applied indefinitely to sequentially build a large number of mats upon the same drum.

After the winding has been completed, the mats are cut together longitudinally of the drum. The condensed mats are expanded transversely of the general lay of the filaments to form elongated mats and are passed together through an oven to cure the binder. After curing, the elongated mats are spirally rolled together into a package.

DETAILED DESCRIPTION

Figure 1:
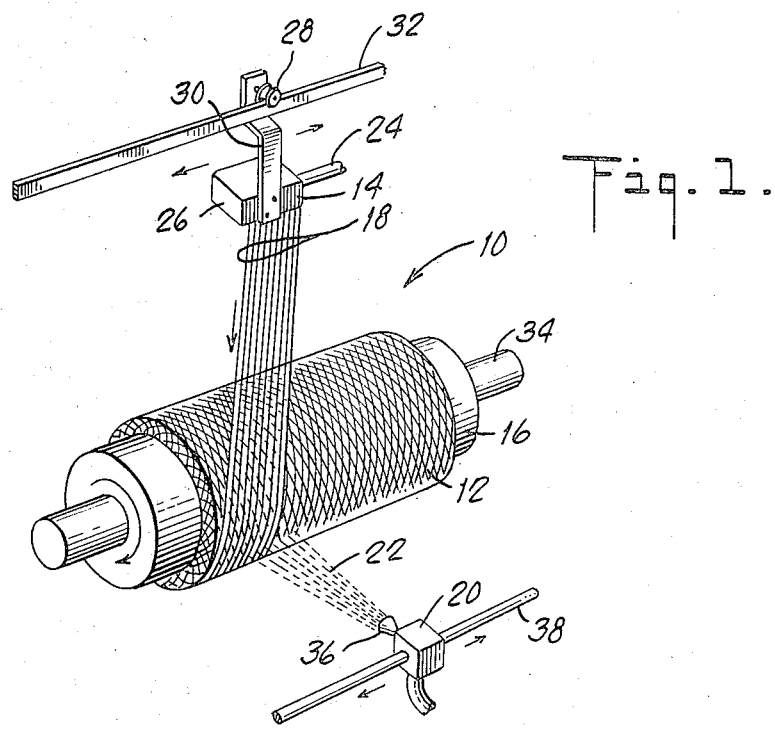
FIG. 1 is a perspective view of apparatus for carrying out the method of the present invention.

Referring to FIG. 1 of the drawing, there is shown apparatus 10 used for producing condensed glass fiber mat 12 in accordance with the well-known Modigliani process. Apparatus 10 generally comprises furnace 14 adapted to reciprocate above rotatable drum 16. Glass filaments 18 are drawn continuously from furnace 14 and are wound about rotating drum 16. Spray gun 20 reciprocates along the length of drum 16 to apply binder solution 22 to filaments 18 being wound upon drum 16.

More particularly, furnace 14 is a conventional gas-fired, refractory, tubular furnace. Heat is supplied to the interior of the furnace by burner 24 positioned to direct a flame through an opening in an end wall of furnace 14. Glass cullet is fed into furnace 14 through an opening in the top wall and is melted therein by the heat produced by burner 24.

Furnace 14 includes bushing 26 located in its bottom wall and having a desired number of orifices therein (not shown) through which glass filaments are drawn. Bushing 26 is made of platinum and is of a conventional design. Wheel 28 connected to furnace 14 by arm 30 supports furnace 14 upon a track 32 such that furnace 14 is enabled to reciprocate along track 32 parallel to the axis of rotation of drum 16. Furnace 14 traverses in accordance with a programmed cycle. This varies the speed of travel and controls the angle of lay and arrangement of filaments 18 wound in strata on drum 16.

Drum 16 is a cylinder of conventional size and shape, is mounted for rotation about shaft 34 and is driven by any conventional means. Drum 16 rotates in the direction of the arrow shown thereon such that filaments 18 are wrapped about drum 16. As drum 16 rotates at a rapid speed relative to the traversing speed of furnace 14, it draws filaments 18 from the orifices in bushing 26.

As the furnace 14 traverses above rotating drum 16, thus winding filaments 18 about drum 16, spray gun 20 applies binder solution 22 to the accumulating strata of filaments through nozzle 36. Spray gun 20 traverses along track 38 arranged parallel to shaft 34 of drum 16. Filaments 18 by themselves do not form an integral network and it is necessary to bind the filaments together to form condensed mat 12. Binder solution 22 for this purpose may be any conventional binder formulation, which typically includes an unsaturated polyester resin, a cross-linking agent, such as diallyl phthalate monomer, a coupling agent or finish, such as silane, and a stabilizer, such as hydroquinone.

As is well known, binder solution 22 is applied at intervals to filaments 18 continuously being wound on drum 16. It is not necessary that binder solution 22 be applied continuously but only that is uniformly penetrate and surround the filaments to create the necessary integral network. Preferably, binder solution 22 is applied in cycles of 1 minute "on" and 1.1 minutes "off". This pattern results in a uniform condensed mat 12.

It is a particular feature of the present invention that a plurality of separable, concentric glass fiber condensed mats can be formed sequentially on the same drum 16. This surprising result is achieved by cyclically applying binder solution 22: first uniformly applying it to the filaments on the drum, then not applying the solution and finally reapplying the binder solution uniformly. During a first period in which filaments are wound on the drum, binder solution 22 is sprayed in cycles of one minute "on" and 1.1 minutes "off", for example. This period lasts for a total of about 90 minutes and results in uniform application of the binder to the filaments. During a second period in which filaments are continuously wound on the drum, no binder solution is sprayed on the filaments and they remain in their unattached state. Then, during a third period in which filaments are continuously wound on the drum, binder solution is again sprayed in cycles of 1 minute "on" and 1.1 minutes "off", for example. This third period is also for duration of about ninety minutes and results in uniform application of the binder to the filaments. As there is no filament adherence during a discrete period of time, two mats will be formed which separate at the location where no binder solution was applied. This lack of uniformity in application of the binder solution permits the forming of overlying, separable mats.

It has been found that the period during which no binder solution should be applied is from about 5 to 12 minutes in duration. If this second period is less than 5 minutes, binder solution 22 will penetrate between the filaments to form an integral network and the mats will not separate from one another. If the period is more than 12 minutes, not enough binder solution will penetrate the filaments and the central strata will disintegrate. The optimum period of time for the second period has been found empirically to be about 8.75 minutes.

The process of the invention is useful in forming a plurality of mats of both the reinforcing and surfacing type. An unlimited number of mats may be produced sequentially on the same drum by intermittently applying the binder solution as described.

Figure 2:
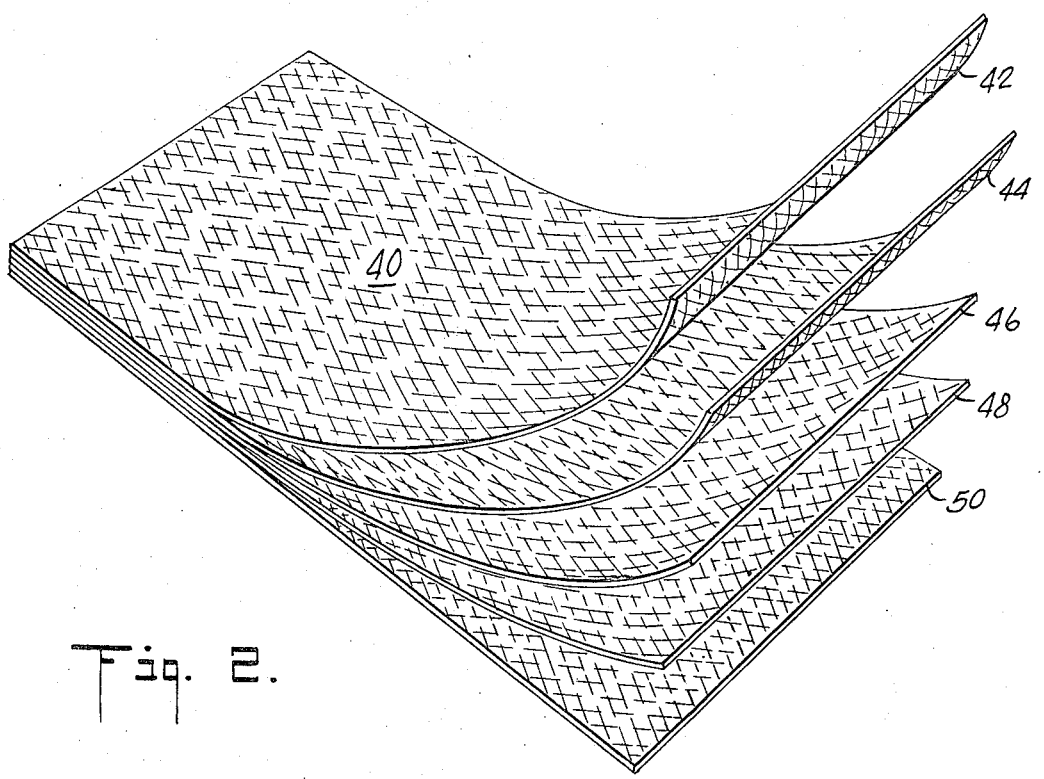
FIG. 2 is a perspective view of the product formed by the method of the invention.

After the plurality of condensed mats 12 have been formed on drum 16, they are removed from the drum by cutting or slitting the mats longitudinally of the drum. In the known manner, the mats are then placed on an expansion table and are stretched or expanded together in a direction transversely of the lay of the filaments. This results in composite elongated mat 40 which comprises a plurality of individual elongated mats 42, 44, 46, 48 and 50, for example, as shown in separated position in FIG. 2. Elongated mat 40 is conveyed through a curing oven in the conventional manner to cure the binder system and produce a threedimensional integral, yet flexible, network. Elongated mat 40 is then wound up into a roll such that individual mats 42, 44, 46, 48 and 50 are spirally rolled into a package.

Sequential production of a plurality of mats upon the same drum has a number of commercial advantages. For the manufacturer of the mats, substantial costs savings are achieved over making separate mats. Less capital investment is needed as an unlimited number of mats can be produced on one drum. As the mats are handled together there is less manual handling time. The mats are conveyed together through the curing oven to provide a greater rate of production. The rolled up mats occupy substantially less storage space. For the purchaser of the mats, a substantial advantage is that the mats have a much lower volume per unit weight. Therefore, the freight charges are lower, less storage space is required and less labor is needed for handling. The mats are positioned for multiple pattern cutting as the roll edges are perfectly even. Additionally, the inner mats of the roll are protected from contamination by foreign matter. The individual mats separate easily for use.

Table 1 indicates the savings in volume per unit weight which are achieved by making a product using the method of the present invention:

Table 1

| Mat Thickness (mils) | Number Of Mats Per Roll | Mat Length (ft.) | Approx. Total Length of Mats On Roll (ft.) | Approx. Equivalent Length Of Single Mat Roll (ft.) |
| --- | --- | --- | --- | --- |
| 10 | 5 | 300 | 1500 | 700 |
| 15 | 4 | 300 | 1200 | 700 |
| 20 | 3 | 300 | 900 | 700 |
| 30 | 3 | 300 | 900 | 700 |

Table 1 indicates that a roll of glass fiber mats produced in accordance with the invention contains substantially more material per unit volume than does a rolled up single mat.

Although it is well known to produce surfacing mats and reinforcing mats of glass fibers, heretofore there has been no practical way to produce a plurality of such mats which are spirally wound together into the same roll. The method of the present invention results in such a product which has substantially less volume per unit weight than individually produced surfacing and reinforcing mats. This results in substantial cost savings to both the manufacturer and the purchaser and converter of the mats.

What is claimed is:

1. Method of sequentially producing a plurality of glass fiber mats, comprising:
   a. continuously drawing glass filaments from a molten glass supply through a plurality of orifices;
   b. continuously winding the filaments about the periphery of a drum rotating about its axis; and
   c. intermittently applying a binder solution to the filaments being wound continuously on the drum, the binder solution being applied cyclically to the filaments at predetermined intervals during a first period of time sufficient in duration to form a first integral mat, the binder solution not being applied during a second period of time of predetermined duration such that an integral mat is not formed at a location, and the binder solution being applied cyclically to the filaments at predetermined intervals during a third period of time sufficient in duration to form an overlying second integral mat concentric with and separable from the first mat at said location where no binder solution is applied.

2. Method according to claim 1, wherein during the first and third periods, the binder solution is applied in cycles of 1 minute "on" and 1.1 minutes "off".

3. Method according to claim 1, wherein during the second period the binder solution is not applied for from about 5 to 12 minutes while the glass filaments are being wound continuously on the drum.

4. Method according to claim 1, wherein during the second period the binder solution is not applied for about 8.75 minutes while the glass filaments are being continuously wound on the drum.

5. In a method of producing glass fiber mats by continuously winding glass filaments about a rotating drum, the improvement comprising applying a binder solution at predetermined intervals to the filaments on the drum to form a plurality of concentric integral mats on the drum during periods of time wherein the binder solution is being applied, the mats being separable at a location where no binder solution is applied for a predetermined period of time sufficient in duration to prevent the formation of an integral mat at said location.

6. Method according to claim 5, wherein the binder solution is cyclically and uniformly applied to the filaments on the drum during said periods of time wherein the binder solution is applied.

7. Method according to claim 6, wherein the cycles are of one minute "on" and 1.1 minutes "off".

8. Method according to claim 5, wherein said predetermined period of time sufficient to prevent the formation of an integral mat is of a duration of from about 5 to 12 minutes.

9. Method according to claim 5, wherein said predetermined period of time sufficient to prevent the formation of an integral mat is of a duration of about 8.75 minutes.

* * * * *